(12) United States Patent
Sesto et al.

(10) Patent No.: US 9,176,602 B2
(45) Date of Patent: Nov. 3, 2015

(54) SPHERICAL REMOTE CONTROL

(71) Applicant: THOMSON LICENSING, Issy de Moulineaux (FR)

(72) Inventors: Adrian Sesto, Los Angeles, CA (US); Mark Leroy Walker, Los Angeles, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 71 days.

(21) Appl. No.: 13/915,420

(22) Filed: Jun. 11, 2013

(65) Prior Publication Data
US 2014/0362025 A1    Dec. 11, 2014

(51) Int. Cl.
G06F 3/044    (2006.01)
G06F 3/0346   (2013.01)
H04N 5/44     (2011.01)
H04N 21/422   (2011.01)
G08C 17/02    (2006.01)
G08C 23/04    (2006.01)
H02J 7/00     (2006.01)

(52) U.S. Cl.
CPC .............. *G06F 3/0346* (2013.01); *G08C 17/02* (2013.01); *G08C 23/04* (2013.01); *H04N 5/4403* (2013.01); *H04N 21/42222* (2013.01); *G08C 2201/32* (2013.01); *H02J 7/0042* (2013.01); *H04N 2005/4428* (2013.01)

(58) Field of Classification Search
CPC ....... G06F 3/044; G06F 3/041; G06F 3/0416; A61B 5/067; G01S 13/06; G01S 13/50
USPC ................... 345/174, 173, 163, 166
See application file for complete search history.

(56) References Cited

U.S. PATENT DOCUMENTS

| | | | |
|---|---|---|---|
| 6,261,247 B1* | 7/2001 | Ishikawa et al. | 600/587 |
| 8,884,901 B2* | 11/2014 | Landau et al. | 345/173 |
| 2004/0071460 A1* | 4/2004 | Nishimura et al. | 396/310 |
| 2006/0152491 A1* | 7/2006 | Lian | 345/166 |
| 2007/0247439 A1* | 10/2007 | Daniel et al. | 345/173 |
| 2007/0257893 A1* | 11/2007 | Philipp et al. | 345/173 |
| 2007/0258329 A1* | 11/2007 | Winey | 367/140 |
| 2010/0130315 A1* | 5/2010 | Steidle | 473/570 |
| 2010/0245246 A1* | 9/2010 | Rosenfeld et al. | 345/163 |
| 2012/0244969 A1* | 9/2012 | Binder | 473/570 |
| 2012/0258799 A1* | 10/2012 | Jouet et al. | 463/36 |

* cited by examiner

*Primary Examiner* — Fred Tzeng
(74) *Attorney, Agent, or Firm* — Robert D. Shedd; Vincent E. Duffy; Palak Bhakta

(57) ABSTRACT

A spherical remote control, including: a spherical shell; a surface sensor to detect a contact on the spherical shell; an accelerometer to detect a movement of the remote control; a circuit to transmit a signal based on the detected contact, orientation and movement; and a first induction coil to receive power for charging a battery in the circuit. The spherical remote control can be placed on a cradle which includes: a power supply; and a second induction coil for providing power to the first induction coil.

25 Claims, 4 Drawing Sheets

SPHERICAL REMOTE CONTROL

TECHNICAL FIELD

This invention relates to remote controls, and more particularly to a spherical remote control for user interface navigation.

BACKGROUND ART

A remote control is a component of an electronics device, most commonly a television set, DVD player and home theater systems originally used for operating the device wirelessly from a short distance. Commonly, remote controls are consumer IR devices used to issue commands from a distance to televisions or other consumer electronics such as stereo systems, DVD players and dimmers. Remote controls for these devices are usually small wireless handheld objects with an array of buttons for adjusting various settings such as television channel, track number, and volume. In fact, for the majority of modern devices with this kind of control, the remote control contains all the function controls while the controlled device itself has only a handful of essential primary controls. Most of these remote controls communicate to their respective devices via infrared signals and some via radio signals, such as WiFi or Bluetooth. The remote control has continually evolved and advanced over recent years to include controls for computers and gaming devices, WiFi or Bluetooth connectivity, motion sensor and tactile feedback enabled, voice control, and functionality of a computer mouse and keyboard.

Traditional remote control devices have buttons and/or a touch pad for user interface navigation. However, repeatedly pressing the up/down and left/right buttons in order to get to the desired location is not very convenient, and the movement on a touch pad is limited by the boundary and size of the touch pad. There are some remote controls that include a gyroscope for allowing users to navigate by pointing the device to a particular direction, for example, pointing the remote to a menu item shown on a TV screen. However, these gyroscopic remote controls have a traditional appearance and do not have sufficient aesthetics for today's modern home.

Thus, in order to enhance a user's experience and interaction, there is a need for a remote control that has an aesthetically pleasing and elegant appearance, as well as the ease and convenience for user interaction with navigating within an interface.

BRIEF SUMMARY

Since a sphere is considered by many people as a simple and elegant geometrical object, and is the only geometrical surface that has no boundary, a spherical remote control would meet the needs that are not met by the current remote controls discussed above.

One embodiment provides a spherical remote control, including: a spherical shell; a surface sensor to detect a contact on the spherical shell; an accelerometer to detect a movement of the remote control; a circuit to transmit a signal based on the detected contact and movement. In addition, the spherical remote control can further include a gyroscope to detect an orientation of the remote control and the circuit can transmit a signal based on any one or more of the detected contact, orientation and movement. Furthermore, the spherical remote control can include an induction coil to receive power for charging a battery to provide power for the remote.

Another embodiment provides a remote control system, including a spherical remote control and a cradle; wherein the spherical remote control includes a spherical shell; a surface sensor to detect a contact on the spherical shell; an accelerometer to detect a movement of the remote control; a circuit to transmit a signal based on the detected contact and movement; and a first induction coil to receive power for charging a battery; and wherein the cradle includes a power supply and a second induction coil for providing power to the first induction coil.

Furthermore, the inductive system may be replaced by a capacitive charging system.

The object and advantages of the invention will be realized and attained by means of the elements and couplings particularly pointed out in the claims. It is important to note that the embodiments disclosed are only examples of the many advantageous uses of the innovative teachings herein. It is to be understood that both the foregoing general description and the following detailed description are exemplary and explanatory and are not restrictive of the invention, as claimed. Moreover, some statements may apply to some inventive features but not to others. In general, unless otherwise indicated, singular elements may be in plural and vice versa with no loss of generality. In the drawings, like numerals refer to like parts through several views.

DETAILED DESCRIPTION

Figure 1:
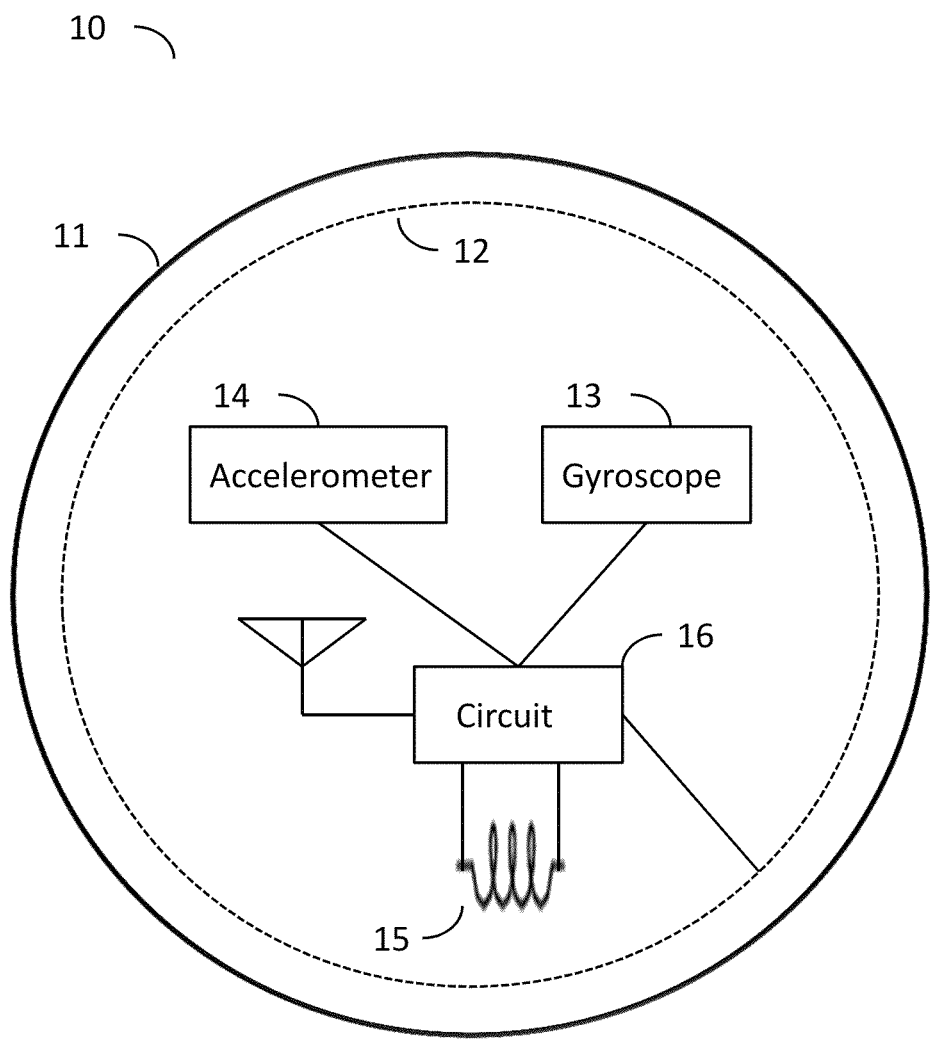
FIG. 1 depicts a schematic diagram of a remote control according to an embodiment.

FIG. 1 shows a spherical remote control 10 according to an embodiment. The spherical remote control 10 includes a spherical shell 11. In FIG. 1, a sensor 12 is shown to be placed just beneath the shell. In other embodiments, the sensor is deposited on the outer surface of the shell, on the inner surface, or within the thickness of the shell.

In some embodiments, the surface sensor 12 can be an array of capacitance touch switches, resistance touch switches, or mechanical touch switches, or a combination of these switches. A capacitance sensor has an electrode that is placed behind a non-conductive shell. The capacitance sensor works by detecting a change in capacitance when a user touches the surface. Furthermore, in some embodiments, the capacitance sensing works if the user is in close proximity of the sensor without even having to touch the surface. Therefore, a user can issue commands by hovering a hand over the spherical shell 11, for example. A resistance sensor has a number of electrodes to make contacts with the user (for example, a finger). The resistance sensor works by detecting a change in the resistance between two electrodes. A mechanical touch switch detects contact by the pressure of the touch. For example, piezo touch switches can be constructed directly onto the shell 11. This mechanical solution enables touch interfaces with any kind of material.

Figure 2:
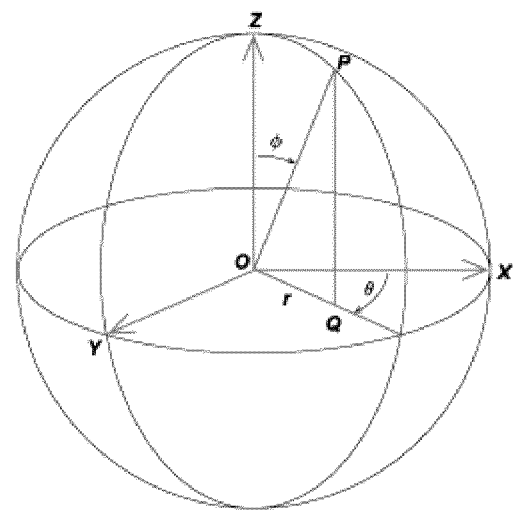
FIG. 2 depicts the spherical coordinates according to an embodiment.

The surface sensor 12 detects contact locations on the spherical shell 11. As shown in FIG. 2, a point P on the spherical surface is represented by the polar angle $\phi$ and the azimuth angle $\theta$ according to an embodiment. In another embodiment, the spherical surface coordinates are locally mapped to Cartesian coordinates (e.g., x-y coordinates). Unlike traditional touch pads, there is no surface boundary on a sphere. Therefore a user command based on, for example, spinning or rolling of the spherical remote control 10 is not available to traditional remote controls. In addition, the surface sensor 12 can differentiate between the palm of the hand vs. the fingers because of the difference in the areas of touch.

Figure 3:
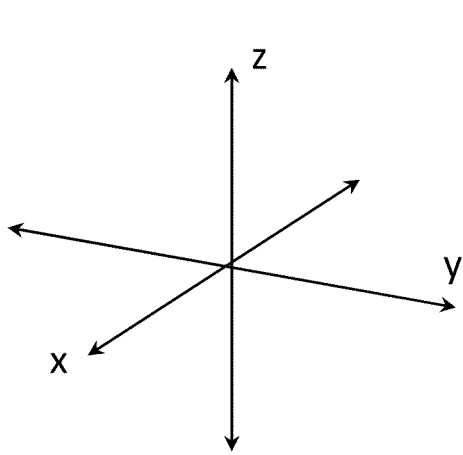
FIG. 3 depicts the movement detection according to an embodiment.

In an embodiment the spherical remote control 10 includes an accelerometer 14 to detect the movement of the remote control. The accelerometer 14 is a sensor that measures the movement of the device. In one embodiment, the accelerometer 14 is a 3-axis micro electro-mechanical system (MEMS) based accelerometer. FIG. 3 shows the three axes of movements that the accelerometer 14 can detect.

Figure 4:
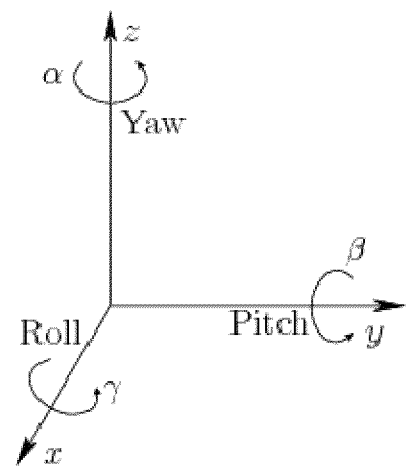
FIG. 4 depicts the orientation detection according to an embodiment.

In another embodiment the spherical remote control 10 includes a gyroscope 13 to detect, or maintain the orientation of the remote control 10 with respect to a fixed direction (e.g., geographical North or magnetic North). In one embodiment, the gyroscope 13 includes a spinning disc that is mounted inside multiple gimbals. In another embodiment, the gyroscope 13 is a MEMS-based gyroscope. FIG. 4 shows the three rotational movements that the gyroscope 13 can detect.

When the remote control's accelerometer measurements are combined with the gyroscope measurements, the remote control 10 can sense motions in six degrees of freedom: up and down, left and right, forward and backwards, as well as the roll, pitch and yaw rotations. This would allow user controls in many 3D applications. For example, in a 3D video game, the character in the video game can be controlled to move left, right, up, down, forward and backward, as well as to look at various directions. Furthermore, when the accelerometer measurements and the gyroscope measurements are combined with the touch sensor measurements, many more user actions can be detected (e.g., picking up the remote, rocking the remote on the palm, or juggling the remote(s)).

The circuit 16 processes the measurements and transmits a signal to a receiver for controlling an application of a device. In one embodiment, the circuit 16 transmits the measurement values to the receiver and the receiver includes logics to interpret and translate these measurements into user commands. In another embodiment, the circuit 16 interprets and translates these measurements into user commands, and transmits the appropriate command signal based on the specific device being controlled. The circuit 16 can include program codes for various devices, such that the spherical remote control can function like a universal remote control. The circuit 16 includes a radio antenna if the signal transmission is via WiFi or Bluetooth, or an infrared transmitter if the signal transmission is via infrared radiation.

In a further embodiment, the circuit 16 is powered by a battery. The battery may be a rechargeable battery. This would eliminate the need to open up the shell 11 to replace the battery. In this embodiment, the rechargeable battery is charged by an induction coil 15. The spherical remote control 10 can be placed in an electromagnetic field so that an electromotive force is established in the induction coil 15 for charging the battery.

Figure 5:
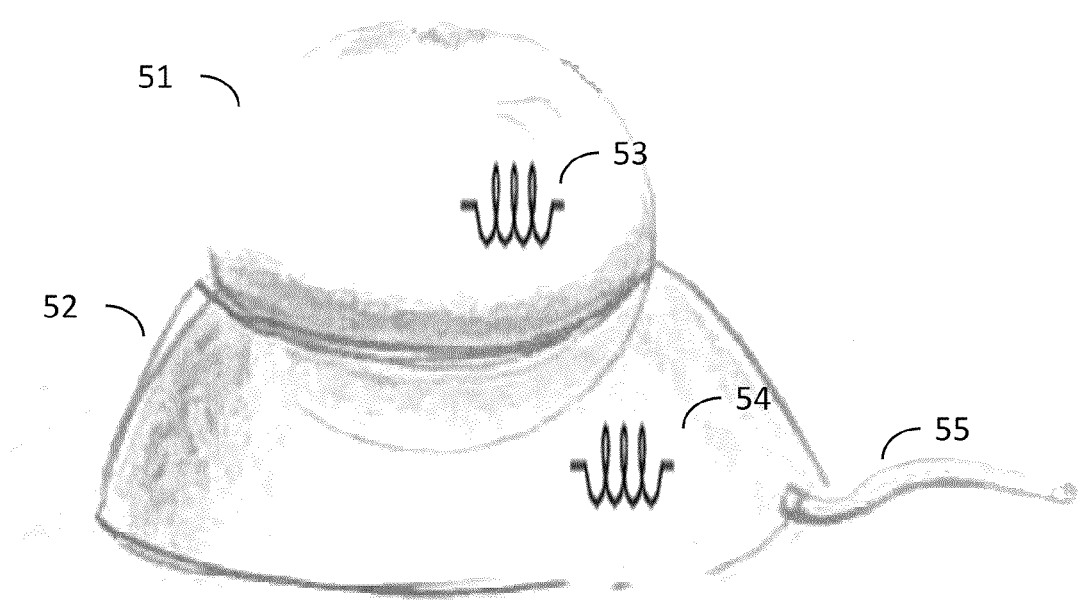
FIG. 5 depicts a schematic diagram of a remote control system according to an embodiment.

One embodiment provides a system including a spherical remote control and a cradle for charging the battery in the remote control. FIG. 5 depicts the situation where the spherical remote control is placed onto a charging cradle. The cradle 52 includes an induction coil 54 and a power source 55. An electromotive force develops at the induction coil 53 in the spherical remote control 51 by the electromagnetic field generated by the induction coil 54. The cradle and the spherical remote control may also be charged using a capacitive charging system with capacitive plates in the cradle and the spherical remote control (not shown).

Unlike current remote control devices, because of the geometrical symmetry of the spherical remote control, there is no need to align the remote control to a specific orientation when placing the remote control onto a charging cradle for an electromagnetic field. The capacitive charging system may have an alignment for charging.

In one embodiment, the cradle is ring-shaped. This ring-shaped cradle can accommodate spherical remotes of different radii. In another embodiment, the cradle has a concave spherical surface that matches the radius of spherical shell of the remote control.

Advantageously, both remote and cradle surfaces are smooth so that the remote control can freely rotate on the cradle. In addition, a fluid may be provided to reduce the friction between the surfaces (such as, a mechanism of an air hockey table or a water fountain). In one embodiment, the remote control includes a self-orienting device so as to automatically align the induction coil 53 in the remote control 51 with respect to the induction coil 54 in the cradle 52 for optimal induction charging. For example, the sphere may include alignment means such as a weight or a magnet. The alignment is also useful for the capacitive charging. Since a gyroscope can detect as well as maintain orientation, the remote control's own gyroscope can also be used as an alignment means in an embodiment. Since an electromagnetic force can be produced on an induction coil, the remote control's own induction coil can also be used as an alignment means in another embodiment.

Figure 6:
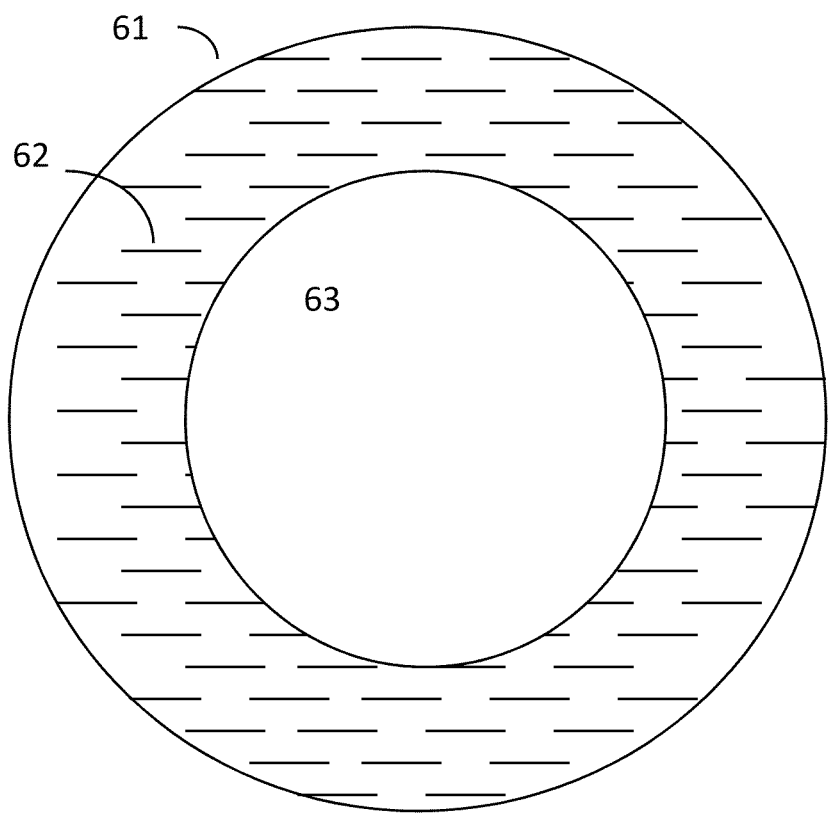
FIG. 6 depicts a schematic diagram of a remote control according to an embodiment.

In one embodiment, the remote control further includes an inner sphere and a viscous liquid (e.g., silicon oil) between the shell and the inner sphere. FIG. 6 shows an inner sphere 63 is floating inside a viscous liquid 62 within the shell 61. This embodiment has the advantage that the remote control can provide haptic feedbacks to the user due to the viscosity of the liquid and inertia of the inner sphere. This haptic feedback makes an otherwise light piece of device into something that has "feel" to it, and thus allows for better user experience.

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A remote control system, comprising a spherical remote control and a cradle, wherein the spherical remote control comprises:
    a spherical shell;
    a surface sensor to detect a contact on the spherical shell;
    an accelerometer to detect a movement of the spherical remote control;
    a circuit to transmit a signal based on the detected contact and movement; and
    a first induction coil to receive power for charging a battery in the circuit; and
wherein the cradle comprises:
    a power supply; and
    a second induction coil for providing power to the first induction coil.

2. The spherical remote control according to claim 1, wherein the surface sensor comprises an array of capacitance touch switches.

3. The spherical remote control according to claim 1, wherein the surface sensor comprises an array of resistance touch switches.

4. The spherical remote control according to claim 1, wherein the surface sensor comprises an array of mechanical touch switches.

5. The spherical remote control according to claim 1, wherein the accelerometer is a micro electro-mechanical system (MEMS) based accelerometer.

6. The spherical remote control according to claim 1, wherein the circuit translates the detected contact and movement into a remote control signal specific to a device.

7. The spherical remote control according to claim 1, further comprising an inner sphere and a viscous liquid, wherein the viscous liquid fills the space between the inner sphere and the spherical shell.

8. The remote control system according to claim 1, wherein the spherical remote control further comprises a gyroscope to detect an orientation of the spherical remote control and the transmitted signal is further based on the detected orientation.

9. The spherical remote control according to claim 8, wherein the gyroscope is a micro electro-mechanical system (MEMS) based gyroscope.

10. The remote control of claim 8, wherein the gyroscope is further configured to align the first induction coil with respect to the second induction coil for optimal inductive charging.

11. The remote control system according to claim 1, wherein the cradle is ring-shaped.

12. The remote control system according to claim 1, wherein the cradle comprises a concave spherical surface that matches the radius of the spherical shell of the spherical remote control.

13. The remote control system according to claim 1, further comprising an alignment means to align the first induction coil with respect to the second induction coil for optimal inductive charging.

14. The remote control of claim 13, wherein the alignment means is a weight.

15. The remote control of claim 13, wherein the alignment means is a magnet.

16. The remote control of claim 13, wherein the alignment means is the first induction coil.

17. A method of using a spherical remote control, the method comprising:
    providing a remote control system comprising a spherical remote control and a cradle, wherein the spherical remote control comprises: a spherical shell; a surface sensor to detect contact on the spherical shell; an accelerometer to detect a movement of the spherical remote control; a circuit to transmit a signal based on the detected contact and movement; and a first induction coil to receive power for charging a battery in the circuit; and wherein the cradle comprises: a power supply; and a second induction coil for providing power to the first induction coil;
    detecting a contact on the spherical shell;
    detecting movement of the spherical remote control; and
    transmitting a signal based on the detected contact and movement.

18. The method of claim 17, wherein the spherical remote control further comprises a gyroscope to detect an orientation of the spherical remote control; and wherein the transmitted signal is further based on the detected orientation.

19. The method of claim 18, wherein the gyroscope is a micro electro-mechanical system (MEMS) based gyroscope.

20. The method of claim 17, wherein the surface sensor of the spherical remote control comprises an array of capacitance touch switches.

21. The method of claim 17, wherein the surface sensor of the spherical remote control comprises an array of resistance touch switches.

22. The method of claim 17, wherein the surface sensor of the spherical remote control comprises an array of mechanical touch switches.

23. The method of claim 17, wherein the accelerometer of the spherical remote control is a micro electro-mechanical system (MEMS) based accelerometer.

24. The method of claim 17, wherein the circuit of the spherical remote control translates the detected contact and movement into a remote control signal specific to a device.

25. The method of claim 17, wherein the spherical remote control further comprises an inner sphere and a viscous liquid, wherein the viscous liquid fills the space between the inner sphere and the spherical shell.

* * * * *